United States Patent Office 2,998,422

Patented Aug. 29, 1961

2,998,422

BIS-(N-HETEROCARBOCYCLIC)ALKANES

Chester John Cavallito and Allan Poe Gray, Decatur, Ill., assignors to Irwin, Neisler and Company, Decatur, Ill., a corporation of Illinois No Drawing. Filed Mar. 25, 1953, Ser. No. 344,677
7 Claims. (Cl. 260—283)

This invention relates to certain N-heterocarbocyclic derivatives and is more particularly concerned with compounds wherein a nitrogen of each of two heterocarbocyclic rings is attached to a carbon of an alkane, and acid addition and quaternary ammonium salts thereof. Specifically, the compounds of the present invention have the following formula:

$$R—C_nH_{2n}—R'$$

wherein R and R' are N-heterocarbocyclic radicals each of which contains between three and five fused rings, at least three of said rings being composed solely of carbon and nitrogen as ring-forming atoms, the said alkylene bridge (—$C_nH_{2n}$—) of the molecule attached to the rings through a ring nitrogen and wherein said R and R' may be the same or different. This invention also contemplates acid addition salts and quaternary amonium salts of compounds having the above formula where such compounds are possible because of the structure of the rings.

The compounds of the present invention have particular utility as hypotensive agents, being active for lowering of blood pressures, as well as being anti-convulsants and muscle relaxants. Additionally, the compounds of the present invention have utility as intermediates in the preparation of more complex organic compounds.

A principal object of the present invention is to provide a new group of organic compounds having physiological activity. Another object of the present invention is to provide a new group of organic compounds having utility as hypotensive agents. Still a further object of the invention is to provide a new group of organic compounds comprising an alkylene bridge between two N-heterocarbocyclic radicals containing between three and five fused rings. Still a further object is to provide acid addition and quaternary ammonium salts of the foregoing compounds. Other objects will become apparent hereinafter.

The compounds of the present invention can be readily prepared by reacting a dihaloalkane with at least 2.0 molecular equivalents of the free heterocyclic base material. The reaction is usually conducted by dissolving the free base in a suitable solvent, such as, for example, acetonitrile, dioxane, anhydrous ethanol, isopropanol, methanol, et cetera, and contacting this solvent solution of the free heterocyclic base material with the dihaloalkane. In some instances, reaction will take place immediately, while in other instances, it may be desirable to reflux the mixture for a period up to 200 hours, or, if necessary, the reaction mixture may be heated in a pressure bomb. The reaction time will depend upon the particular reagents employed, the degree of reaction required, reaction temperature, et cetera. While reflux temperature of the solvent mixture is preferred, if the reactants do not react at room temperature, other temperatures between room temperature and pressure bomb temperatures may be employed. At least 2.5 molecular equivalents of the heterocyclic base are desirably used for each mole of dihaloalkane, and preferably three to four moles are employed, amounts in excess of this not enhancing the reaction. Separation of the reaction products is readily accomplished by adding ether to the reaction mixture, if precipitation has not occurred during the reaction; and collecting the precipitate which forms. If precipitation has occurred during the heating step, the precipitate may be collected in conventional manner, as by filtration, centrifugation, decantation, et cetera.

Representative dihaloalkanes which are suitable in the process of the present invention include, for example, 1,3-dibromopropane, 1,4-dichlorobutane, 1,3-diiodobutane, 1,5-dibromopentane, 1,3-dibromopentane, 1,6-dibromohexane, 1,7-diiodoheptane, 1,5-dichlorooctane, 1,8-dibromooctane, 1,9-dichlorononane, 1,4-diiodononane, 1,10-dibromopentane, et cetera. The particular halogen selected as substituent on the dihaloalkane will control the particular ammonium salt formed. In the instance where the ring base contains a tertiary basic nitrogen atom, or the basic nitrogen atom of the heterocarbocyclic ring to be reacted does not carry a replaceable hydrogen, the product will be a quaternary ammonium compound, the anion of which corresponds with the halogen of the dihaloalkane. Thus, where a dibromoalkane is used as a reactant, the resulting product will contain bromine as an anion of the end product.

Representative N-heterocarbocyclic substances, containing three to five fused rings and containing only carbon and nitrogen as ring-forming components in at least three of the rings, which are suitable in the process of the present invention include, for example, harman, alpha-carboline, indenopyridine, yohimbine, indenoquinoline, pyridindole, indoloquinoline, pyrroloquinoline, phenanthridine, pyridazoquinolizine, indoloquinolizine, indazolopyridopyrazole, fluorenoimidazole, indoloacridine, benzophenanthroline, benzacridine, anthradipyrazole, tetrahydroberberine, et cetera. In any event, the heterocyclic moiety of the present invention must contain in at least three of the rings, carbon and nitrogen as the only ring-forming components, three to five fused rings, and must be attached to the alkylene chain to form the compounds of the present invention through a nitrogen of the ring radical.

Quaternary ammonium salts and acid addition salts of the compounds of the present invention, if the compound contains a nitrogen capable of quaternizing, may be readily formed by reacting an organic solvent solution of the compound of the present invention with a solvent solution of the quaternizing or acid addition compound. Suitable solvents include, for example, ethanol, propanol, isopropanol, dioxane, acetonitrile, et cetera. Representative quaternizing or acid addition compounds which are satisfactory in the process of the present invention include, for example, acetic acid, hydrochloric acid, hydrobromic acid, maleic acid, malonic acid, sulfuric acid, methylbromide, ethylbromide, propyliodide, allylchloride, benzylchloride, dimethyl sulfate, et cetera.

The following examples are given to illustrate procedures for preparing certain compounds of the present invention, but are not to be construed as limiting the invention thereto:

*Example 1*

A solution of 5.46 grams (0.03 mole) of harman

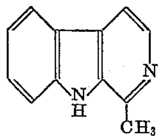

and 2.3 grams (0.01 mole) of 1,5-dibromopentane in 150 milliliters of acetonitrile was refluxed for 48 hours, the precipitate collected and washed with hot acetonitrile. After several recrystallizations from ethanol-water solutions there was obtained 3.76 grams (64 percent of the theoretical yield based on the amount of alkyl dihalide employed) of pentamethylene bis-[2-(1-methyl-9-pyrid-3,4 b-indolium)]dibromide, melting at 291–293 degrees centigrade with decomposition.

*Analysis*.—Calculated: Br, 26.89; C, 58.60; H, 4.09. Found: Br, 26.22; C, 58.95; H, 5.28.

*Example 2*

In a manner similar to that of Example 1, a mixture of harman and 1,3-dibromopropane were reacted to yield trimethylene bis-[2-(1-methyl-9-pyrid-3,4 b-indolium)]-dibromide, melting in excess of 300 degrees centigrade.

*Example 3*

In a manner similar to that of Example 1, harman and 1,4-dibromobutane were reacted to yield tetramethylene bis - [2 - (1 - methyl-9-pyrid - 3,4 b-indolium)]dibromide, melting at 333–336 degrees centigrade.

*Analysis*.—Calculated: Br, 27.54; C, 57.94; H, 4.86. Found: Br, 27.44; C, 57.36; H, 5.08.

*Example 4*

In a manner similar to that of Example 1, harman and 1,6-dibromohexane were reacted to yield hexamethylene bis - [2 - (1 - methyl-9-pyrid - 3,4 b-indolium)]dibromide, melting in excess of 310 degrees centigrade.

*Analysis*.—Calculated: Br, 26.27; C, 59.22; H, 5.30. Found: Br, 25.78; C, 59.65; H, 5.63; C, 59.56; H, 5.43.

*Example 5*

In a manner similar to that of Example 1, alpha-(n-propyl)-beta-carboline was reacted with 1,5-dibromopentane to yield pentamethylene-bis-[2-(1-propyl-9-pyrid-3,4 b-indolium)]dibromide.

*Analysis*.—Calculated: Br, 24.57; C, 60.93; H, 5.89. Found: Br, 24.22; C, 60.73; H, 6.17.

*Example 6*

In a manner similar to that of Example 1, beta-carboline (norharman)

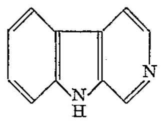

was reacted with 1,5-dibromopentane to yield pentamethylene bis-[2-(9-pyrid-3,4 b-indolium)]dibromide, melting at 241–242 degrees centigrade.

*Analysis*.—Calculated: Br, 28.22; C, 57.26; H, 4.63. Found: Br, 27.85; C, 57.18; H, 4.98.

*Example 7*

To 5.9 grams (0.03 mole) of oven-dried py-N-methylharman in 100 milliliters of tertiary-butyl alcohol was added 2.3 grams (0.01 mole) of 1,5-dibromopentane, and the green fluorescing solution refluxed for 45 hours. The precipitate which formed was collected and recrystallized four times from methanol. There was thus obtained pentamethylene bis-[9-(1,2-dimethyl-9-pyrid-3,4 b-indolium)]dibromide, as a light yellow powder, melting at 288–290 degrees centigrade.

*Analysis*.—Calculated: Br, 25.68; C, 59.81; H, 5.52. Found: Br, 25.11; C, 59.90; H, 5.69.

Pentamethylene bis-[9-(1,2-dimethyl-9-pyrid-3,4 b-indolium)]dibromide can also be prepared by refluxing molar equivalents of harman with sodamide in toluene for about 48 hours, adding 1,5-dibromopentane, refluxing ten additional hours and treating the isolated bis base with methyl bromide to form the bis quarternary bromide. Bis salts of the base can also be prepared.

*Example 8*

Five grams (0.025 mole) of py-N-methyltetrahydroharman in sixty milliliters of absolute ethanol was refluxed for twenty hours with 2.0 grams (0.008 mole) of 1,6-dibromohexane. The solution was cooled, 25 milliliters of anhydrous ether added, and the resulting precipitate recovered. After four reprecipitations from propanol with anhydrous ether, there was obtained 2.3 grams (45 percent of the theoretical yield) of hexamethylene bis-[2-(1,2-dimethyl-1,2,3,4-tetrahydro - 9 - pyrid-3,4 b-indolium)]dibromide, a white, hygroscopic powder, melting gradually at 190–230 degrees centigrade. No attempt was made to separate diastereoisomers.

*Analysis*.—Calculated: Br, 24.80; C, 59.63; H, 6.88. Found: Br, 24.56; C, 59.60; H, 7.12.

*Example 9*

To a solution of 4.9 grams (0.0265 mole) of tetrahydroharman and 3.05 grams (0.0125 mole) of 1,6-dibromohexane in fifty milliliters of 95 percent ethanol was added five grams (0.035 mole) of anhydrous potassium carbonate and the mixture refluxed for 24 hours. The cooled solution was diluted with 500 milliliters of water and the resinous precipitate extracted with ether. Drying and removal of the ether left a resin which crystallized from alcohol and water to yield hexamethylene bis-[2-(1-methyl-1,2,3,4-tetrahydro-9-pyrid-3,4 b-indole)], melting at 110–120 degrees centigrade.

This base may be treated with acids such as hydrochloric acid, to yield bis-amine salts, or, for example, with methyliodide to give hexamethylene bis-[2-(1,2-dimethyl-1,2,3,4-tetrahydro-9-pyrid - 3,4 b-indolium)] diiodide.

*Example 10*

In a manner similar to that of Example 8, py-N-methyltetrahydroharman was reacted with 1,4-dibromobutane to yield tetramethyl bis-[2-(1,2-dimethyl-1,2,3,4-tetrahydro-9-pyrid - 3,4 b-indolium)]dibromide, which evolved gas at 110–110 degrees, but was not completely melted at 250 degrees centigrade.

*Analysis*.—Calculated: C, 58.44; H, 6.54. Found: C, 58.16, H, 6.78; C, 58.43, H, 6.61; C, 58.39, H, 7.12.

*Example 11*

A solution of 2.6 grams (0.0155 mole) of alpha-carboline and 1.2 grams (0.0052 mole) of 1,5-dibromopentane in a mixture of twenty milliliters of dioxane and 25 milliliters of ethanol was refluxed on the steam bath for 100 hours. The cooled solution was precipitated with 25 milliliters of ether. Recrystallization from propanol yielded 9.6 gram (twenty percent of the thoretical yield) of pentamethylene bis-[1-(9-pyrid-2,3 b-indolium)]dibromide, melting at 243–253 degrees centigrade.

*Analysis*.—Calculated: Br, 28.22; C, 57.26; H, 4.63. Found: Br, 27.80; C, 57.31; H, 4.90.

*Example 12*

A solution of 3.5 grams of pentamethylene bis-[2-(1-methyl-9-pyrid-3,4 b-indolium)]dibromide in 800 milliliters of water at eighty degrees centrigrade was made alkaline with ten milliliters of twenty percent aqueous sodium hydroxide solution. After fifteen minutes on the steam bath, the mixture was cooled, and the yellow crystalline precipitate collected. Recrystallization from ethanol-water yielded 1.89 grams of the base melting at 242–250 degrees centigrade. After drying in the oven at eighty degrees centigrade, the material was dissolved in 200 milliliters of acetonitrile and refluxed for 8.5 hours with fifteen milliliters of methyl iodide. The precipitate was recrystallized from aqueous ethanol to yield 2.83 grams (67 percent of the theoretical yield) of yellow powder, melting at 265–267 degrees centigrade with decomposition, pentamethylene bis-[2-(1,9 - dimethyl - 9-pyrid-3,4 b-indolium)]diiodide.

*Analysis*.—Calculated: I, 35,43; C, 51.97; H, 4.78. Found: I, 34.94; C, 51.96; H, 4.82; I, 34.99.

*Example 13*

A solution of ten grams (0.028 mole) of yohimbine and 2.2 grams (0.0093 mole) of 1,5-dibromopentane in a mixture of 100 milliliters of dioxane and fifty milliliters of propanol was heated on a steam bath for fifteen hours. The precipitate that formed on the addition of ether was reprecipitated twice from ethanol with ether and finally recrystallized from propanol to yield 1.2 grams (13 percent of the theoretical yield) of a white powder, pentamethylene bis-(4-yohimbinium)dibromide, melting at 249–250 degrees centigrade.

*Analysis.*—Calculated: Br, 17.02; C, 60.12; H, 6.66. Found: Br, 16.60; C, 59.78; H, 6.72.

*Example 14*

In a manner similar to that of Example 13, yohimbine was reacted with 1,4-dibromobutane to yield tetramethylene bis-(4-yohimbinium)dibromide, melting at 267–274 degrees centigrade.

*Analysis.*—Calculated: Br, 17.28; C, 59.74; H, 6.54. Found: Br, 16.98; C, 59.64; H, 6.69.

*Example 15*

In a manner similar to that of Example 13, yohimbine was reacted with 1,6-dibromohexane to yield hexamethylene bis-(4-yohimbinium)dibromide, melting at 269–276 degrees centigrade.

*Analysis.*—Calculated: Br, 16.77; C, 60.50; H, 6.77; N, 5.88. Found: Br, 16.90; C, 59.94; H, 7.07; N, 6.03.

*Example 16*

In a manner similar to that of Example 13, yohimbine was reacted with 1,10-dibromodecane to yield decamethylene bis-(4-yohimbinium)dibromide, melting at 230–232 degrees centigrade.

*Analysis.*—Calculated: Br, 15.84; C, 61.90; H, 7.19. Found: Br, 15.37; C, 61.66; H, 6.95.

*Example 17*

Twelve grams (0.035 mole) of tetrahydroberberine was dissolved in a mixture of 250 milliliters of tertiary-butyl alcohol and sixty milliliters of toluene and refluxed for 160 hours with 2.8 grams (0.0115 mole) of 1,6-dibromohexane. The resinous precipitate which formed on cooling was dissolved in cold ethanol and precipitated with ether. Two repetitions of this process gave 1.2 grams (eleven percent of the theoretical) of hexamethylene bis - (7 - tetrahydroberberinium)dibromide, melting at 220–226 degrees centigrade.

*Analysis.*—Calculated: Br, 17.32; C, 59.87; H, 5.90. Found: Br, 17.39; C, 60.29; H, 6.12; Br, 17.27; C, 59.72; H, 6.11.

*Example 18*

In a manner similar to that of Example 16, tetrahydroberberine was reacted with 1,4-dibromobutane to yield tetramethylene bis-(7-tetrahydroberberinium)dibromide, melting at 195–205 degrees centigrade.

*Analysis.*—Calculated: Br, 17.86; C, 59.06; H, 5.63. Found: Br, 17.46; C, 58.68; H, 5.60.

*Example 19*

In a manner similar to that of Example 16, tetrahydroberberine was reacted with 1,10-dibromodecane to yield decamethylene bis-(7-tetrahydroberberinium)dibromide, melting at 199–212 degrees centigrade.

*Analysis.*—Calculated: Br, 16.33; C, 61.35; H, 6.38. Found: Br, 15.86; C, 60.85; H, 6.46; C, 61.13; H, 6.50.

Various modifications may be made in the method and products of the present invention without departing from the spirit or scope thereof, and its is to be understood that we limit ourselves only as defined in the appended claims.

We claim:

1. An organic compound selected from the group consisting of (A) those comprising two N-heterocarbocyclic radicals, each radical containing between three and five fused rings joined by an alkylene bridge attached to a nitrogen of each of said radicals, at least three of said rings being composed solely of carbon and nitrogen in the ring, said alkylene bridge containing three to ten carbon atoms, inclusive, and (B) non-toxic acid addition and quaternary ammonium salts of the foregoing compounds.

2. Pentamethylene bis-[2-(1-methyl - 9 - pyrid - 3,4 b-indolium)]dibromide.

3. Pentamethylene bis-[9(1,2-dimethyl9-9pyrid-3,4 b-indolium)]dibromide.

4. Hexamethylene bis-[2-1,2-dimethyl - 1,2,3,4 - tetrahydro-9-pyrid-3,4 b-indolium)]dibromide.

5. Pentamethylene bis-(4-yohimbinium)dibromide.

6. Hexamethylene bis - (7 - tetrahydroberberinium)dibromide.

7. Quaternary ammonium salts of compounds having the formula:

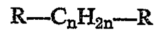

$$R—C_nH_{2n}—R$$

wherein R is an N-heterocarbocyclic radical selected from the group consisting of unsubstituted carbolines, yohimbines, berberine, and hydrogenated and lower-alkyl-substituted carbolines, yohimbines and berberines, said R being attached to the alkylene ($—C_nH_{2n}—$) group through a ring nitrogen, and wherein $n$ is an integer between three and ten, inclusive.

References Cited in the file of this patent

UNITED STATES PATENTS

| | | |
|---|---|---|
| 2,271,378 | Searle | Jan. 27, 1942 |
| 2,465,774 | Wilson | Mar. 29, 1949 |
| 2,644,789 | Shenk | July 7, 1953 |

OTHER REFERENCES

Barlow et al.: Brit. J. Pharmacol., vol. 3, pp. 298–304 (1948).

Gray et al.: J. Am. Chem. Soc., vol. 76, pp. 2792–7 (1954).